（12） United States Patent
Jiao et al.

(10) Patent No.: US 10,318,532 B2
(45) Date of Patent: Jun. 11, 2019

(54) DISCOVERY OF APPLICATION INFORMATION FOR STRUCTURED DATA

(71) Applicant: International Business Machines Corporation, Armonk, NY (US)

(72) Inventors: Li Mei Jiao, Beijing (CN); Ju Wei Shi, Beijing (CN); Chen Wang, Beijing (CN); Lan Jun Wang, Beijing (CN); Shuo Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 998 days.

(21) Appl. No.: 14/802,215

(22) Filed: Jul. 17, 2015

(65) Prior Publication Data

US 2017/0017728 A1 Jan. 19, 2017

(51) Int. Cl.
*G06F 16/24* (2019.01)
*G06F 16/2455* (2019.01)

(52) U.S. Cl.
CPC ................. *G06F 16/2456* (2019.01)

(58) Field of Classification Search
CPC .............................................. G06F 17/30498
USPC ....................................................... 707/803
See application file for complete search history.

(56) References Cited

U.S. PATENT DOCUMENTS

| 7,720,872 B1* | 5/2010 | Biere | G06Q 10/10 707/802 |
| 8,838,556 B1 | 9/2014 | Reiner et al. | |
| 2011/0004622 A1* | 1/2011 | Marson | G06Q 10/06 707/770 |
| 2011/0106854 A1 | 5/2011 | Friedlander et al. | |
| 2011/0295860 A1* | 12/2011 | Dewar | G06Q 10/06 707/748 |

\* cited by examiner

*Primary Examiner* — Pierre M Vital
*Assistant Examiner* — Andrew N Ho
(74) *Attorney, Agent, or Firm* — Francis Lammes; Stephen J. Walder, Jr.; Grant A. Johnson (57) ABSTRACT

A mechanism is provided for identifying a usage for data in a data structure. A set of configuration files associated with a set of services are analyzed to identify at least one class associate with the data in the data structure thereby forming a data structure-to-class mapping. Source code associated with the set of services is analyzed to identify a set of services used by at least one class in the data structure-to-class mapping thereby forming a service-to-class mapping. A set of specification files associated with the set of services are analyzed to identify a set of uses associated with at least one service in the service-to-class mapping thereby forming a use-to-service mapping. An identification of usage information of the data structure is generated using the data structure-to-class mapping, the service-to-class mapping, and the use-to-service mapping.

17 Claims, 8 Drawing Sheets

DISCOVERY OF APPLICATION INFORMATION FOR STRUCTURED DATA

BACKGROUND

The present application relates generally to an improved data processing apparatus and method and more specifically to mechanisms for discovering application information for structured databases.

In large enterprises, there are a large number of structured and semi-structured data collections residing in multiple information systems, such as wide-table collections (i.e. HBase™, Cassendra™), relational databases (i.e., DB2®, Oracle®), or the like. As well recognized, massive data collections provide such enterprises great value. Therefore, more enterprises are taking initiatives to collect and integrate such data. However, once an enterprise has collected massive amounts of structure or semi-structured data, enterprises often have issues identifying uses for the collected data. In other words, identifying uses for such massive data collections is critical for example, what tasks to utilize data for and from what perspective the data is valuable to the enterprise.

Nowadays, more enterprise systems employ a service-oriented architecture (SOA) and provide an increasing proportion of resources as (cloud) services. Services use description metadata to describe not only the characteristics of these services, but also the data that drives them. In other words, the released services and their associated descriptions become a wealthy source of usage information for these provided resources. Traditionally, usage information of such data has not been well documented. More often, the use of some data collections reside in the mind of the employee that caused the data to be collected in the first place. Thus, when the employee is no longer employed by the enterprise, the intended use of the data collection is lost. When necessary, data is manually screened and usage information is manually summarized. Manually screening and annotating of the data is very labor and time consuming, and often leads to inaccuracy because the screening and annotations are from one employees perspective, who often times has a deficient knowledge about the data.

SUMMARY

In one illustrative embodiment, a method, in a data processing system, is provided for identifying a usage for data in a data structure. The illustrative embodiment analyzes a set of configuration files associated with a set of services to identify at least one class associate with the data in the data structure thereby forming a data structure-to-class mapping. The illustrative embodiment analyzes source code associated with the set of services to identify a set of services used by at least one class in the data structure-to-class mapping thereby forming a service-to-class mapping. The illustrative embodiment analyzes a set of specification files associated with the set of services to identify a set of uses associated with at least one service in the service-to-class mapping thereby forming muse-to-service mapping. The illustrative embodiment generates an identification of usage information of the data structure using the data structure-to-class mapping, the service-to-class mapping, and the use-to-service mapping.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Again, in large enterprises, there are a large number of structured and semi-structured data collections residing in multiple information systems. However, once the data is collected and utilized for its initial purpose, the data may or may not be reused and enterprises often have issues identifying uses for the collected data. Furthermore, once an employee who initially caused the collection of data is no longer employed by the enterprise, the intended use of the data collection is lost, since most often the intended use of the data resides within the employees mind. Moreover, manually screening and annotating of the data at a later time is very labor and time consuming and often leads to inaccuracy because the screening and annotations are from one employees perspective, who often times has a deficient knowledge about the data.

Thus, the illustrative embodiments provide for discovering usage information of both structured and semi-structured data utilizing associated services and their related information. That is, given a collection of structure data and/or a collection of semi-structured data, the mechanisms of the illustrative embodiments identify one or more related services. Then, based on these identified services, the mechanisms generate and summarize usage information for the given data.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of the examples provided herein without departing from the spirit and scope of the present invention.

Figure 1:
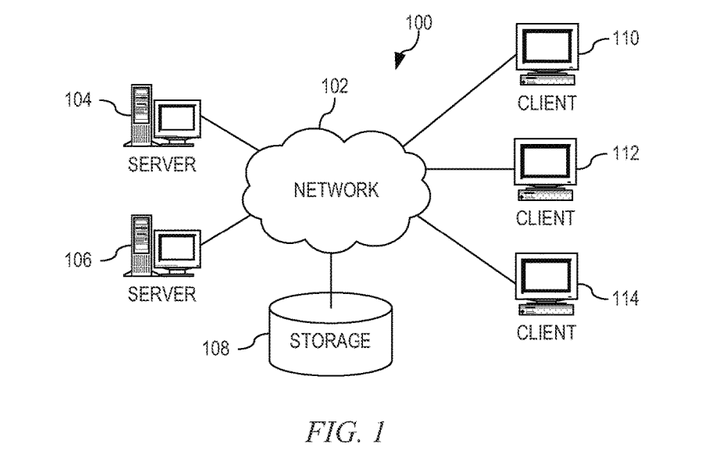
FIG. 1 is an example diagram of a distributed data processing system in which aspects of the illustrative embodiments may be implemented.
Figure 2:
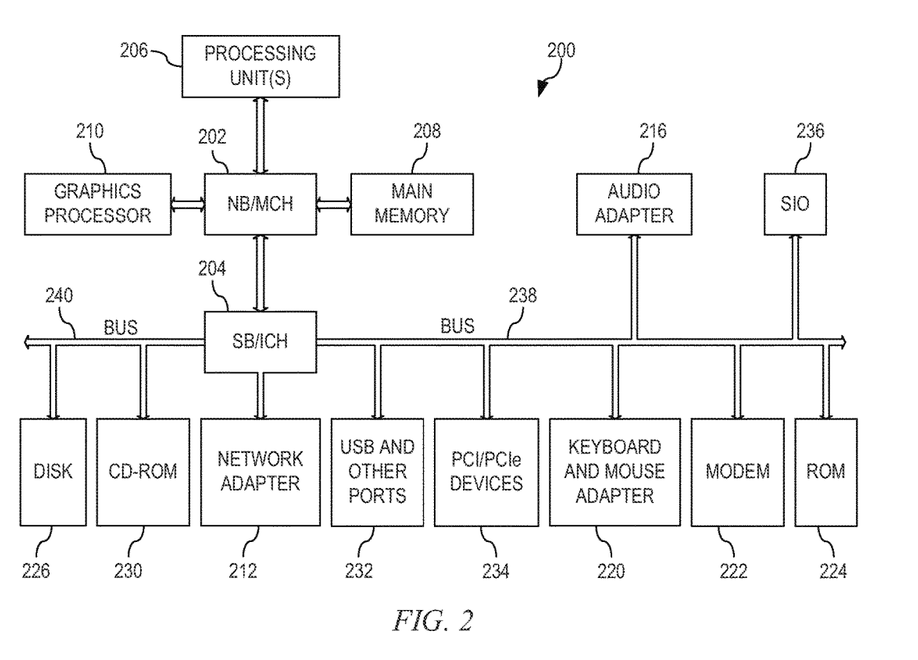
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 generates data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, the distributed data processing system 100 may also be implemented to include a number of different types of networks, such as for example, intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (RDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, white PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and generates control of various components within the data processing system 200 in FIG. 2. As a client, the operating system may be a commercially available operating system such as Microsoft® Windows 7®. An object-oriented programming system, such as the Java™ programming system, may run in conjunction with the operating system and generates calls to the operating system from Java™ programs or applications executing on data processing system 200.

As a server, data processing system 200 may be, for example, an IBM eServer™ System P® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that generates for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Data stored in a data processing system, such as distributed data processing system 100 in FIG. 1 or data processing system 200 in FIG. 2 and, more particularly, storage unit 108 of FIG. 1 or main memory 208 of FIG. 2, may store structured data and/or semi-structured data in a data structure, table, or the like. However, when data is stored in, for example, a table, the name of the table and names of the attributes within the table may be obscure as to the actual meaning of the data in the table. For example, a table may be named "ORDIMEEXTN" and attribute or field names within the tables may go unnamed, such as "Attr1," "Attr2," "Field1," or "Field2." Moreover, even if the administrator of the table generates names for the attributes or fields, the names of the attributes or fields may not be indicative of the actual data but rather a name that only has meaning to the administrator, such as "ORDCHNLTYP_ID." Therefore, the names associated with table and attributes or fields within the table, may be meaningless, in poor semantic form, unrecognizable, or the like. Still further, the data stored in the fields may provide little if any insight into what data is stored within the various fields. For example, one set of fields may comprises numbers such as "100231532," "100231534," and "100231537." While the fields may be recognizable as numeric, there is little insight as to what the numbers mean. As another example, another set of fields may comprises names such as "Desire," "Lumia," and "Galaxy Note II." While the fields may be recognizable as text, there is little insight as to what the text means. Thus, the illustrative embodiments provide for discovering usage information of both structured and semi-structured data utilizing associated services and their related information. That is, in service-oriented architecture (SOA) and cloud environments, services that utilize structured and semi-structured data utilize description metadata to describe not only the characteristics of the services but the data that drives the services. In other words, the services of a SOA or cloud environment and their associated descriptions are a wealthy source of application information, which may be utilized to identify structured and semi-structured data information.

Figure 3:
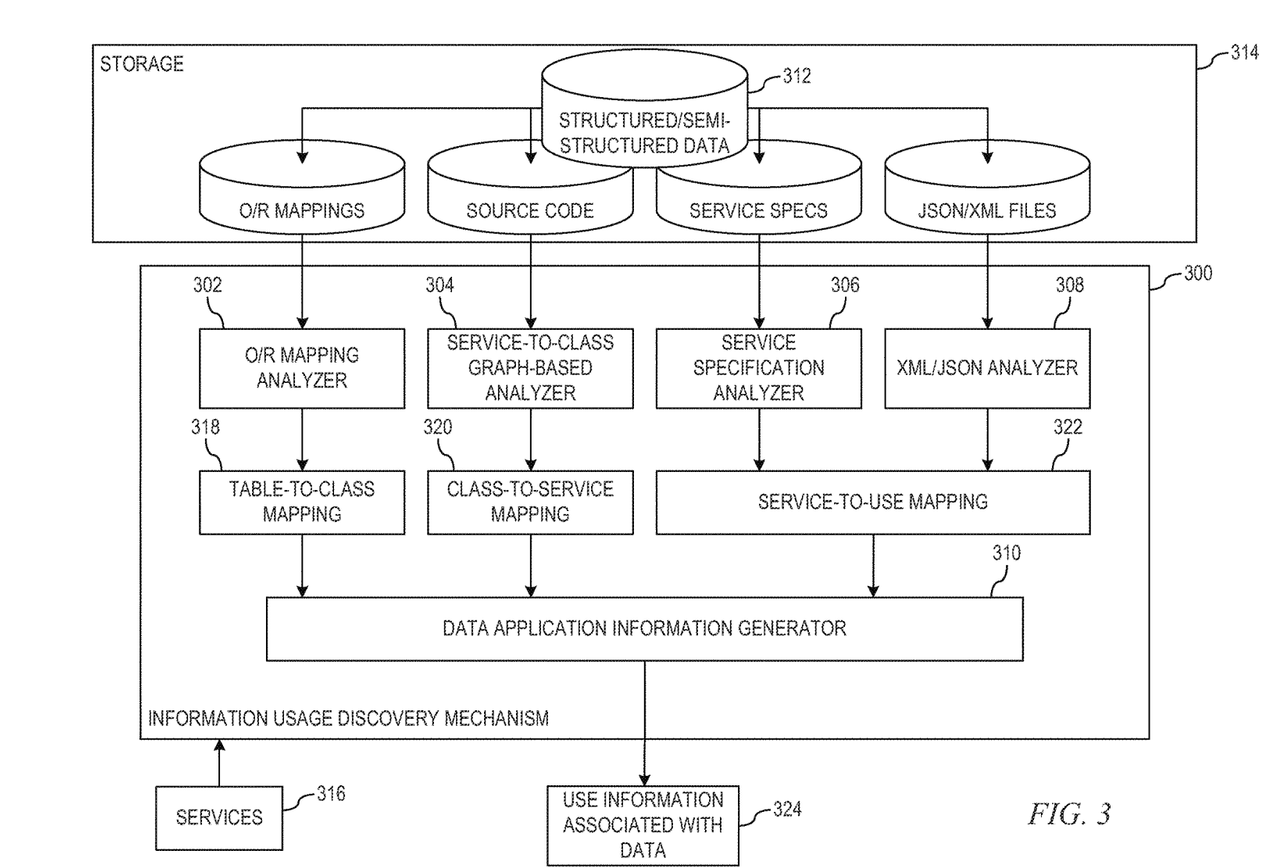
FIG. 3 illustrates a mechanism for discovering usage information of both structures and semi-structured data utilizing associated services and their related information in accordance with one illustrative embodiment.

FIG. 3 illustrates a mechanism for discovering usage information of both structures and semi-structured data utilizing associated services and their related information in accordance with one illustrative embodiment. The information usage discovery mechanism of FIG. 3 may be implemented, for example, in a data processing system such as distributed data processing system 100 in FIG. 1 or data processing system 200 in FIG. 2. As shown in FIG. 3, information usage discovery mechanism 300 comprises Object-Relational (O/R) mapping analyzer 302, service-to-class graph-based analyzer 304, service specification analyzer 306. Extensible Markup Language (XML)/JavaScript Object Notation (JSON) analyzer 308, and data application information generator 310, which may be implemented as specialized hardware, software executing on general purpose hardware, software instructions stored on a medium such that the instructions are readily executable by specialized or general purpose hardware, a procedure or method for executing the functions, or a combination of any of the above.

Figure 4:
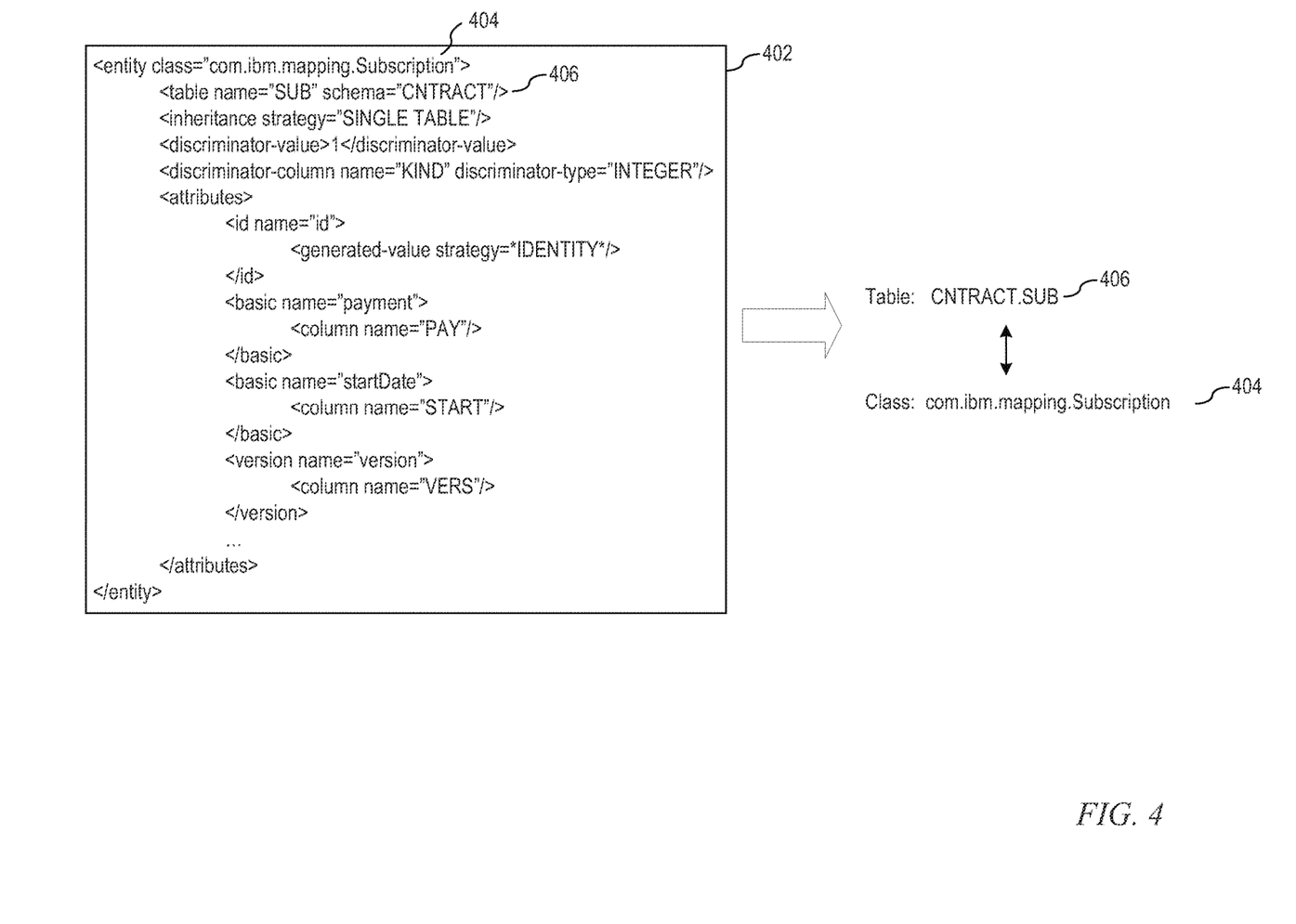
FIG. 4 depicts an exemplary class identification process in accordance with an illustrative embodiment.

In operation, information usage discovery mechanism 300 receives an identification of one or more structured or semi-structure data structures, tables, or the like 312 in storage 314. Hereafter, the remaining description refers to structured or semi-structure data structures, tables, or the like 312 simply as one or more tables 312, O/R mapping analyzer 302 uses O/R mapping to convert data between incompatible type systems in object-oriented programming languages. In the instant analysis, O/R mapping analyzer 302 utilizes O/R mapping configuration files, profiles, or the like associated with one or more services 316 that utilize the one or more tables 312 to identify classes associated with each of the one or more tables 312. That is, O/R mapping analyzer 302 performs a pattern-based analysis of the configuration files of the one or more services 316 to identify class(es) used by the one or more services 316 and, based on those identified classes, one or more of the one or more tables 312 accessed by the class. FIG. 4 depicts an exemplary class identification process in accordance with an illustrative embodiment. With reference to the example in FIG. 4, in exemplary configuration file 402, an entity class "com.ibm.mapping.Subscription" 404 may be identified related to a table name="SUB" and schema="CNTRACT" 406, i.e. table data. Thus, in analyzing the configuration files of the one or more services 316, O/R mapping analyzer 302 generates table-to-class mapping 318, which comprises a table-to-class relationship of table data "CNTRACT.SUB" 406 to class "com.ibm.mapping.Subscription" 404.

Using table-to-class mapping 318, service-to-class graph-based analyzer 304 may perform a three-step analysis of the source code associated with each of the one or more services 316. Service-to-class graph-based analyzer 304 initially locates one or more snippets of source code with respect to a given service. In accordance with the illustrative embodiments, the snippets of source code may encompass one or more portions of the source code or all of the source code, depending on the number of services utilized within the source code.

Figure 5A:
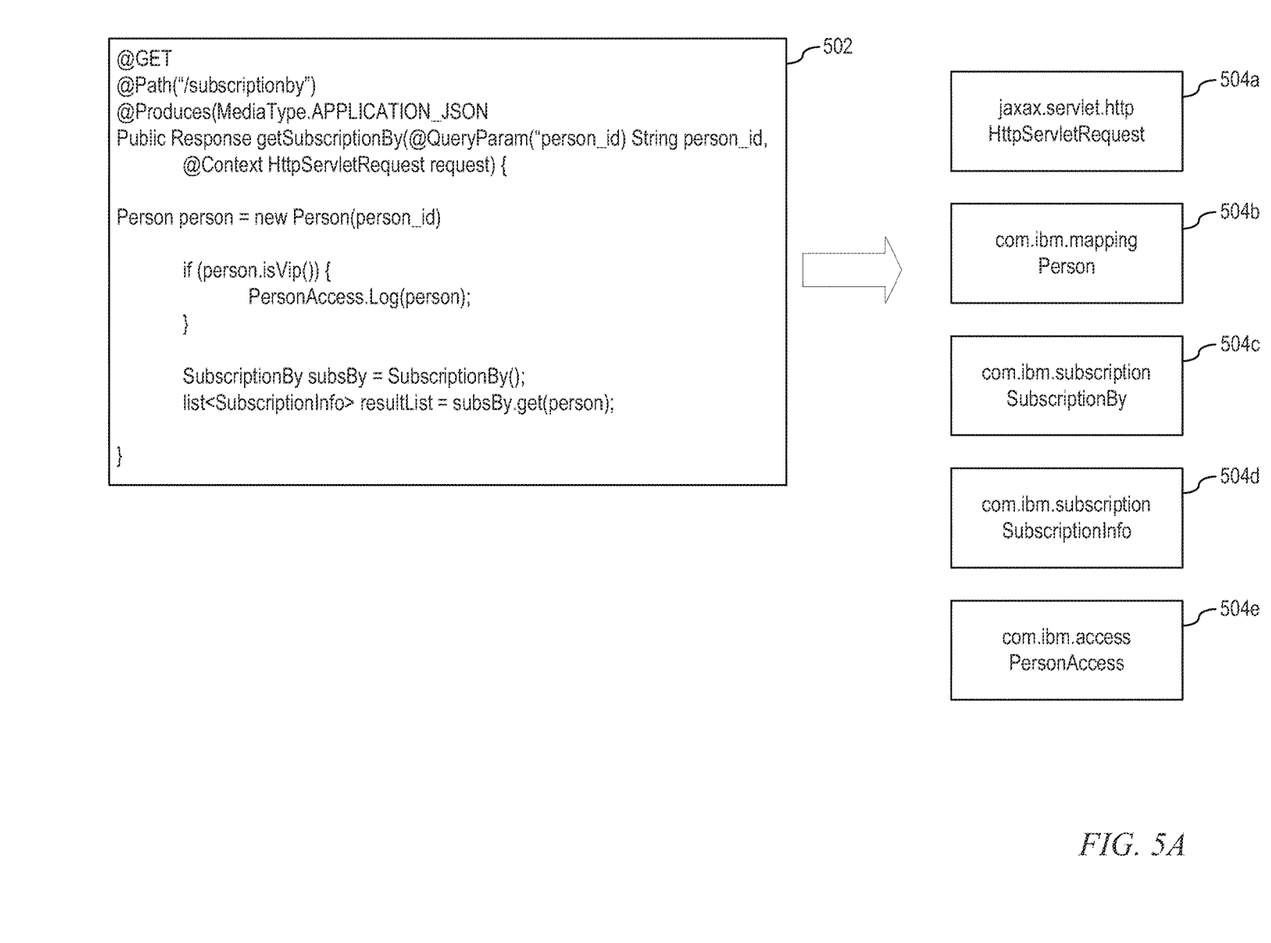
FIGS. 5A-5C depicts exemplary candidate class to service identification process in accordance with an illustrative embodiment.
Figure 5B:
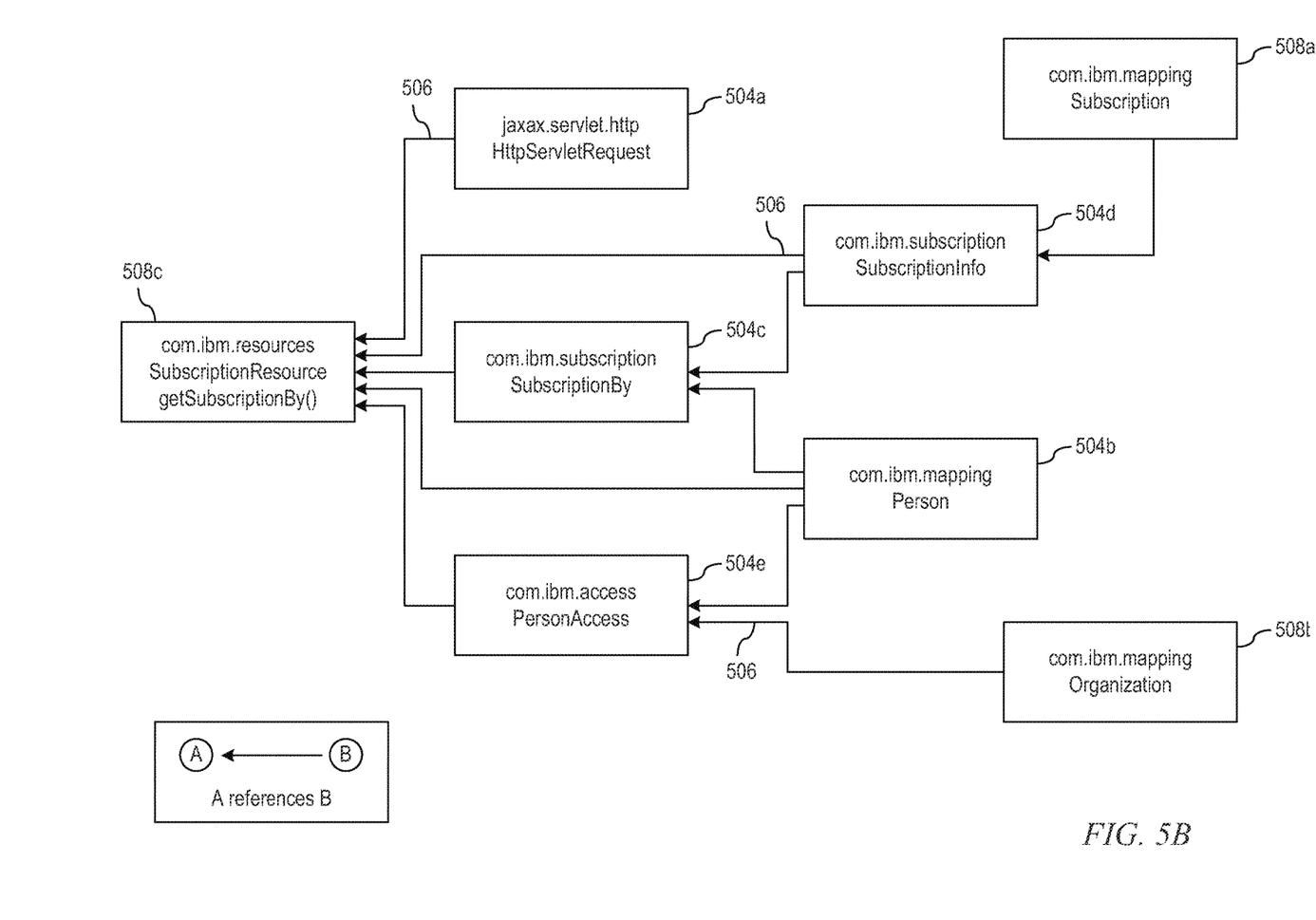
Figure 5C:
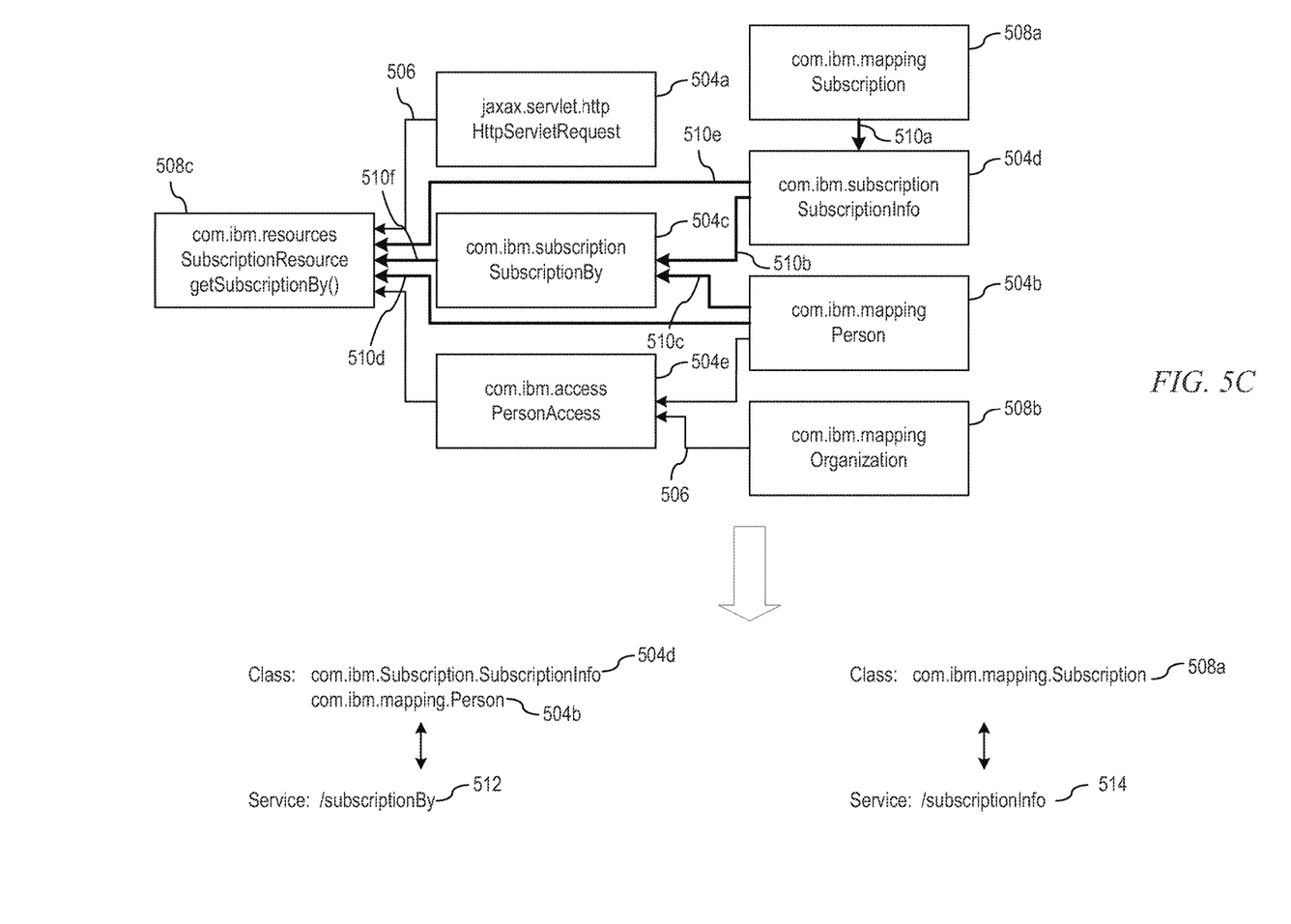

Service-to-class graph-based analyzer 304 then analyzes the source code to identify and extract: candidate classes that have instances within the source code, candidate classes that have instances that are directly or indirectly referenced by the source code, and/or candidate classes that have directed data-influence to the source code. FIGS. 5A-5C depicts exemplary candidate class to service identification process in accordance with an illustrative embodiment. In the first step of this analysis, which is to identify and extract candidate classes that have instances within the source code 502, service-to-class graph-based analyzer 304 may analyze the source code 502 and for example, the candidate of classes, such as candidate classes 503a-504e illustrated in FIG. 5A. In the second step of the analysis, which is to identify and extract candidate classes that have instances that are directly or indirectly referenced by the source code 502, service-to-class graph-based analyzer 304 may analyze the source code 502 and identify, for example, direct or indirect references 506 in FIG. 5B between the candidate classes 504a-504e as well as identify an extract other candidate classes 508a-508b that are directly or indirectly referenced by candidate classes 504a-504e. In a third step of the analysis, which is to identify and extract candidate classes that have directed data-influence to the source code 502, service-to-class graph-based analyzer 304 identifies those ones of references 506 that have a directed data-influence to the source code 502, i.e. directed data-influence references 510a-510f, as illustrated in FIG. 5C.

Thus, with respect to FIG. 5A and as an example, service-to-class graph-based analyzer 304 selects one or more classes from candidate classes 504a-504e which are also identified table-to-class mapping 318, which identifies and extracts class 504b. However, as is illustrated in FIG. 5B, class 504b only comprises a portion of the table-to-class mapping 318. That is, while class 504b comprises "com.ibm.mapping," class 504b does not comprise the sub class of "Subscription." Nonetheless, service-to-class graph-based analyzer 304 identifies class 504b as a selected class. With respect to FIG. 5B, service-to-class graph-based analyzer 304 identifies and extracts, in addition to class 504b, classes 504d and 508a. Class 508a is identified because "com.ibm.mapping" directly modifies class 504d's "com.ibm.subscription" and thus, forms the class of "com.ibm.mapping.Subscription." Class 504d is selected because it "com.ibm.mapping" directly modifies class 504c's "com.ibm.subscription."

Finally, with respect to FIG. 5C and based on the directed data-influence references 510a-510f, service-to-class graph-based analyzer 304 selects only those classes that directly influence the service, class 504b and 504d, or classes that have directed data influence of the service, class 508a. Thus, in analyzing the source code 502 of one or more services 316, service-to-class graph-based analyzer 304 generates class-to-service mapping 320 that comprises, for example, a class-to-service relationship of "com.ibm.mapping.Subscription" 504d to service "/subscriptionBy" 512, "com.ibm.mapping.Subscription" 508a to "/subscriptionInfo" 514, and "com.ibm.mapping.Person" 508a to "/subscriptionBy" 512.

Figure 6:
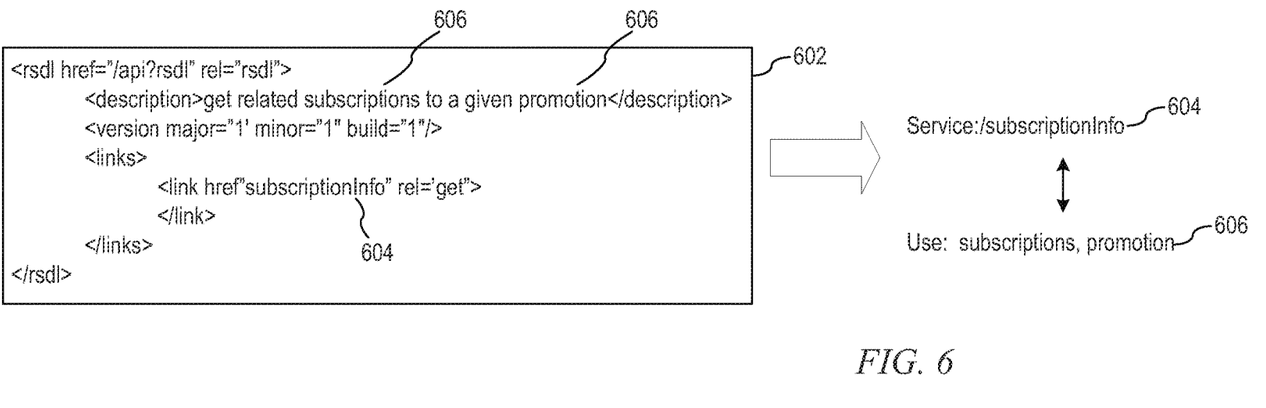
FIG. 6 depicts an exemplary specification file analysis in accordance with an illustrative embodiment.

Using the class-to-service mapping 320, service specification analyzer 306 analyzes one or more specification files associated with the one or more services 316. That is, for a particular specification file, service specification analyzer 306 analyzes the specification files to identify instances where a call or reference to a service 316 appears and to identify one or more textual descriptors associated with the call or reference to the service 316. For example, FIG. 6 depicts an exemplary specification file analysis in accordance with an illustrative embodiment. With reference to the example, in FIG. 6, service specification analyzer 306 analyzes specification file 602 and identifies call or reference 604 to service 316 "/subscriptionInfo." Once the call or reference to the service 316 has been identified, service specification analyzer 306 identifies one or more textual descriptors 606 associated with the call or reference to the service 316, such as "subscriptions" and "promotion." Thus, in analyzing the specification file 602 associated with service 316, service specification analyzer 306 generates service-to-use mapping 322 that comprises, for example, a service-to-use relationship of "/subscriptionInfo" to "subscription" as well as a service-to-use relationship of "/subscriptionInfo" to "promotion."

Figure 7:
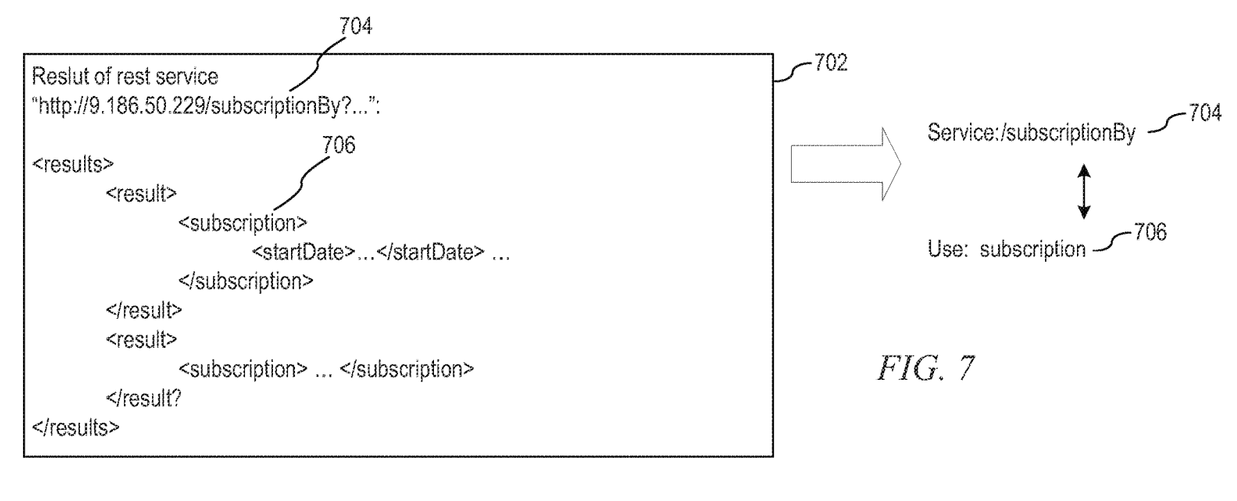
FIG. 7 depicts an exemplary results analysis in accordance with an illustrative embodiment.

Similar to the process performed by service specification analyzer 306 and using the class-to-service mapping 320, XML/JSON analyzer 308 analyzes one or more XML/JSON results associated with the one or more services 316. That is, for a particular XML/JSON result, XML/JSON analyzer 308 analyzes the XML/JSON results to identify instances where a call or reference to a service 316 appears and to identify one or more textual descriptors associated with the call or reference to the service 316. For example, FIG. 7 depicts an exemplary results analysis in accordance with an illustrative embodiment. With reference to the example in FIG. 7, XML/JSON analyzer 308 analyze XML/JSON results 702 and identifies call or reference 604 to service 316 "/subscriptionBy." Once the call or reference to the service 316 has been identified, then XML/JSON analyzer 308 identifies one or more textual descriptors 706 associated with the call or reference to the service 316, such as "subscription." Thus, in analyzing the XML/JSON results 702 associated with service 316, XML/JSON analyzer 308 generates and/or aggregates information into service-to-use mapping 322 that comprises, for example, a service-to-use relationship of "/subscriptionBy" to "subscription."

Using table-to-class mapping 318 generated by O/R mapping analyzer 302, class-to-service mapping 320 generated by service-to-class graph-based analyzer 304, and service-to-use mapping 322 generated by service specification analyzer 306 and XML/JSON analyzer 308, data application information generator 310 then performs one or more operations, such as a join operation, map reduction operation, or the like, to generate an identification of usage information of the structured data and/or the semi-structured data from which table-to-class mapping 318, class-to-service mapping 320, and service-to-use mapping 322 were generated. For example and using the examples in FIG. 4-7, data application information generator 310 identifies the table-to-class relationship of "CNTRACT.SUB" to "com.ibm.mapping­.Subscription" illustrated in FIG. 4 and joins, map reduces, or the like, this table-to-class relationship to the class-to-service relationships of "com.ibm.mapping.Subscription" to "/subscriptionBy" and "com.ibm.mapping.Subscription" to "/subscriptionInfo" illustrated in FIG. 5C. Further, data application information generator 310 joins, map reduces, or the like, the class-to-service relationships of "com.ibm.map­ping.Subscription" to "/subscriptionBy" and "com.ibm­.mapping.Subscription" to "/subscriptionInfo" illustrated in FIG. 5C to the service-to-use relationships of "/subscrip­tionInfo" to "subscription" and "/subscriptionInfo" to "pro­motion" as welt as the a service-to-use relationship of "/subscriptionBy" to "subscription."

Thus, utilizing the identified table-to-class relationships, the class-to-service relationships, and the service-to-use relationships, data application information generator 310 generates an identification of usage information "subscrip­tion" and "promotion" to the structured data or the semi­structured data of "CNTRACT.SUB," which data applica­tion information generator 310 outputs as use information associated with data 324. By identifying such structure data and/or semi-structured data to usage information, enterprise may easily identify what the structure or semi-structured data may be used for and utilize the structure data and/or semi-structured data to improve their business.

The present invention may be a system, a method, and/or a computer program product. The computer program prod­uct may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch­cards or raised structures in a groove having instructions recorded thereon, and any suitable combination of the fore­going. A computer readable storage medium, as used herein, is not to be construed as being transitory signals per se, such as radio waves or other freely propagating electromagnetic waves, electromagnetic waves propagating through a wave­guide or other transmission media (e.g., tight pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may com­prise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, elec­tronic circuitry including, for example, programmable logic circuitry, field-programmable gate arrays (FPGA), or pro­grammable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program prod­ucts according to embodiments of the invention. It will be understood that each block of the flowchart illustrations and/or block diagrams, and combinations of blocks in the flowchart illustrations and/or block diagrams, can be imple­mented by computer readable program instructions.

These computer readable program instructions may be provided to a processor, of a general purpose computer, special purpose computer, or other programmable data pro­cessing apparatus to produce a machine, such that the instructions, which execute via the processor of the com­puter or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 8:
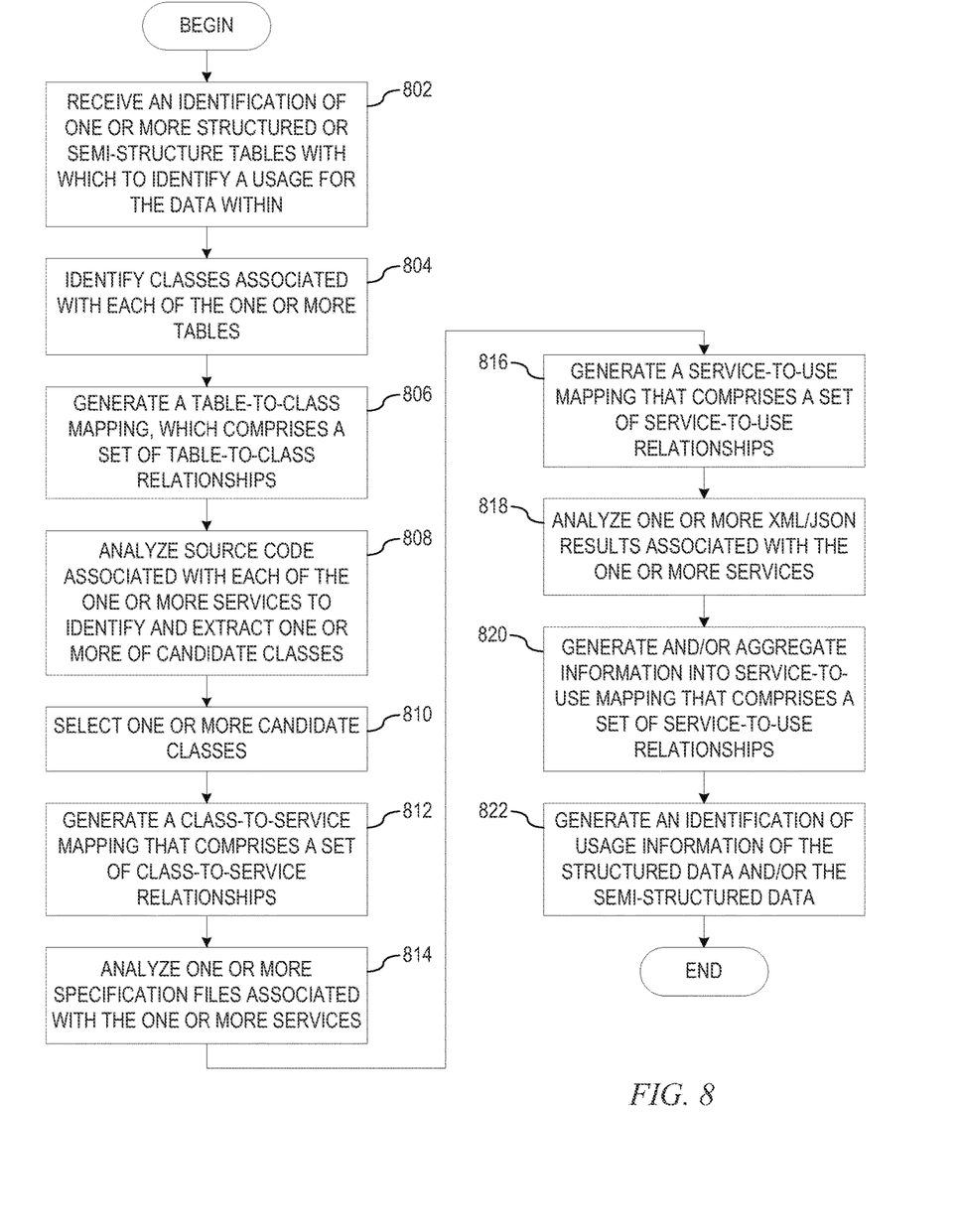
FIG. 8 depicts one exemplary operation performed by an information usage discovery mechanism in accordance with an illustrative embodiment.

FIG. 8 depicts one exemplary operation performed by an information usage discovery mechanism in accordance with an illustrative embodiment. As the operation begins, the information usage discovery mechanism receives an identification of one or more structured or semi-structure data structures, tables, or the like with which to identify a usage for the data within (step 802). An O/R mapping analyzer within the information usage discovery mechanism utilizes O/R mapping configuration files, profiles, or the like, associated with one or more services that utilize the one or more tables in order to identify classes associated with each of the one or more tables (step 804). That is, the O/R mapping analyzer performs a pattern-based analysis of the configuration files of the one or more services to identify class(es) used by the one or more services and in doing so generates a table-to-class mapping, which comprises a set of table-to-class relationships (step 806).

Using table-to-class mapping, a service-to-class graph-based analyzer within the information usage discovery mechanism analyzes source code associated with each of the one or more services to identify and extract one or more of candidate classes that have instances within the source code, candidate classes that have instances that are directly or indirectly referenced by the source code, or candidate classes that have directed data-influence to the source code (step 808). Based on the analysis, the service-to-class graph-based analyzer selects one or more candidate classes (step 810) and generates a class-to-service mapping that comprises a set of class-to-service relationships (step 812).

Using the class-to-service mapping, a service specification analyzer within the information usage discovery mechanism analyzes one or more specification files associated with the one or more services (step 814). That is, for a particular service specification, the service specification analyzer analyzes the specification files to identify instances where a call or reference to a service appears and to identify one or more textual descriptors associated with the call or reference to the service. In analyzing the specification files associated with service, the service specification analyzer generates a service-to-use mapping that comprises a set of service-to-use relationships (step 816). Additionally, a XML/JSON analyzer within the information usage discovery mechanism analyzes one or more XML/JSON results associated with the one or more services (step 818). That is, for a particular XML/JSON result, the XML/JSON analyzer analyzes the XML/JSON results to identify instances where a call or reference to a service appears and to identify one or more textual descriptors associated with the call or reference to the service. In analyzing the XML/JSON results associated with service, the XML/JSON analyzer generates and/or aggregates information into service-to-use mapping that comprises a set of service-to-use relationships (step 820).

Using the table-to-class mapping generated by the O/R mapping analyzer, the class-to-service mapping generated by the service-to-class graph-based analyzer, and the service-to-use mapping generated by the service specification analyzer and the XML/JSON analyzer, a data application information generator within the information usage discovery mechanism then performs one or more operations, such as a join operation, map reduction operation, or the like, to generate an identification of usage information of the structured data and/or the semi-structured data (step 822), with the operation ending thereafter. By identifying such structure data and/or semi-structured data to usage information, enterprise may easily identify what the structure or semi-structured data may be used for and utilize the structure data and/or semi-structured data to improve their business.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for discovering usage information of both structured and semi-structured data utilizing associated services and their related information. That is, given a collection of structure data and/or a collection of semi-structured data, the mechanisms of the illustrative embodiments identify one or more related services and, based on these identified services, generate and summarize usage information for the given data.

As noted above, it should be appreciated that the illustrative embodiments may take the form of an entirety hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, the at least one memory comprising instructions that are executed by the at least one processor to cause the at least one processor to be configured to implement an information usage discovery mechanism for identifying a usage for data in a data structure, the method comprising:

analyzing, by an object-relational mapping analyzer of the information usage discovery mechanism, a set of configuration files associated with a set of service to identify at least one class associated with the data in the data structure thereby forming a data structure-to-class mapping;

analyzing, by a service-to-class graph-based analyzer of the information usage discover mechanism, source code associated with the set of service to identify a set of service used by at least one class in the data structure-to-class mapping thereby forming a service-to-class mapping, wherein analyzing the source code associated with the set of services to identify the set of services used by the at least one class comprises:

locating, by the service-to-class graph-based analyzer, one or more snippets of source code with respect to a service in the set of services;

analyzing, by the service-to-class graph-based analyzer, the source code to identify and extract candidate classes that have instances within the source code, candidate classes that have instances that are directly referenced by the source code, and candidate classes that have directed data-influence to the source code; and selecting, by the service-to-class graph-based analyzer, one or more of classes that directly influence the service or classes that have directed data influence of the service;

analyzing, by a service specification analyzer of the information usage discovery mechanism, a set of specification files associated with the set of services to identify a set of uses associated with at least one service in the service-to-class mapping thereby forming a use-to-service mapping; and generating, by a data application information generator of the information usage discovery mechanism, an identification of usage information of the data structure using the data structure-to-class mapping, the service-to-class mapping, and the use-to-service mapping.

2. The method of claim 1, further comprising:

analyzing, by an Extensible Markup Language (XML)/JavaScript Object Notation (JSON) analyzer of the information discovery mechanism, a set of results associated with the set of services to identify a further set of uses associated with the at least one service in the service-to-class mapping, wherein analyzing the set of results identifies where a call or a reference to a service appears and a set of textual descriptors associated with the call or the reference identifying a use of the service.

3. The method of claim 2, wherein, upon identifying a use associated with at least one service in the service-to-class mapping, the method further comprises:

aggregating, by the Extensible Markup Language (XML)/JavaScript Object Notation (JSON) analyzer, the identified use into the use-to-service mapping.

4. The method of claim 1, wherein the data structure is a structured data structure or a semi-structure data structure.

5. The method of claim 1, wherein generating the identification of usage information of the data structure utilizes a join operation or a map reduction operation.

6. The method of claim 1, wherein analyzing the set of specification files identifies where a call or reference to a service appears and a set of textual descriptors associated with the call or reference identifying a use of the service.

7. A computer program product comprising a non-transitory computer readable storage medium having a computer readable program stored therein, wherein the computer readable program, when executed on a computing device, causes the computing device to implement an information usage discovery mechanism for identifying a usage for data in a data structure, and further causes the computing device to:

analyze, by an object-relational mapping analyzer of the information usage discovery mechanism, a set of configuration files associated with a set of services to identify at least one class associated with the data in the data structure thereby forming a data structure-to-class mapping;

analyze source code associated with the set of services to identify a set of services used by at least one class in the data structure-to-class mapping thereby forming a service-to-class mapping, by a service-to-class graph-based analyzer of the information usage discovery mechanism, source code associated with the set of services to identify a set of services used by at least one class in the data structure-to-class mapping thereby forming a service-to-class mapping, wherein the computer readable program to analyze the source code associated with the set of services to identify the set of services used by the at least one class further causes the computing device to:

locate, by the service-to-class graph-based analyzer, one or more snippets of source code with respect to a service in the set of services;

analyze, by the service-to-class graph-based analyzer, the source code to identify and extract candidate classes that have instances within the source code, candidate classes that have instances that are directly referenced by the source code, and candidate classes that have directed data-influence to the source code; and select, by the service-to-class graph-based analyzer, one or more of classes that directly influence the service or classes that have directed data influence of the service;

analyze, by a service specification analyzer of the information usage discovery mechanism, a set of specification files associated with the set of service to identify a set of uses associated with at least one service in the service-to-class mapping thereby forming a use-to-service mapping; and generate, by a data application information generator of the information usage discovery mechanism, an identification of usage information of the data structure using the data structure-to-class mapping, the service-to-class mapping, and the use-to-service mapping.

8. The computer program product of claim 7, wherein the computer readable program further causes the computing device to:

analyze, by an Extensible Markup Language (XML)/JavaScript Object Notation (JSON) analyzer of the information discovery mechanism, a set of results associated with the set of service to identify a further set of uses associated with the at least one service in the service-to-class mapping, wherein analyzing the set of results identifies where a call or a reference to a service appears and a set of textual descriptors associated with the call or the reference identifying a use of the service.

9. The computer program product of claim 8, wherein, upon identifying a use associated with at least one service in the service-to-class mapping, the computer readable program further causes the computing device to: aggregate, by the Extensible Markup Language (XML)/JavaScript Object Notation (JSON) analyzer, the identified use into the use-to-service mapping.

10. The computer program product of claim 7, wherein the data structure is a structured data structure or a semi-structure data structure.

11. The computer program product of claim 7, wherein generating the identification of usage information of the data structure utilizes a join operation or a map reduction operation.

12. The computer program product of claim 7, wherein analyzing the set of specification files identifies where a call or reference to a service appears and a set of textual descriptors associated with the call or reference identifying a use of the service.

13. An apparatus comprising: a processor; and a memory coupled to the processor, wherein the memory comprises instructions which, when executed by the processor, cause the processor to implement an information usage discovery mechanism for identifying a usage for data in a data structure, and further causes the processor to:

analyze, by an object-relational mapping analyzer of the information usage discovery mechanism, a set of configuration files associated with a set of services to identify at least one class associated with the data in the data structure thereby forming a data structure-to-class mapping;

analyze source code associated with the set of services to identify a set of services used by at least one class in the data structure-to-class mapping thereby forming a service-to-class mapping, by a service-to-class graph-based analyzer of the information usage discovery mechanism, source code associated with the set of services to identify a set of services used by at least one class in the data structure-to-class mapping thereby forming a service-to-class mapping, wherein the computer readable program to analyze the source code associated with the set of services to identify the set of services used by the at least one class further causes the computing device to:

locate, by the service-to-class graph-based analyzer, one or more snippets of source code with respect to a service in the set of services;

analyze, by the service-to-class graph-based analyzer, the source code to identify and extract candidate classes that have instances within the source code, candidate classes that have instances that are directly referenced by the source code, and candidate classes that have directed data-influence to the source code; and select, by the service-to-class graph-based analyzer, one or more of classes that directly influence the service or classes that have directed data influence of the service;

analyze, by a service specification analyzer of the information usage discovery mechanism, a set of specification files associated with the set of services to identify a set of uses associated with at least one service in the service-to-class mapping thereby forming a use-to-service mapping; and generate, by a data application information generator of the information usage discovery mechanism, an identification of usage information of the data structure using the data structure-to-class mapping, the service-to-class mapping, and the use-to-service mapping.

14. The apparatus of claim 13, wherein the instructions further cause the processor to:

analyze, by an Extensible Markup Language (XML)/JavaScript Object Notation (JSON) analyzer of the information discovery mechanism, a set of results associated with the set of services to identify a further set of uses associated with the at least one service in the service-to-class mapping, wherein analyzing the set of results identifies where a call or a reference to a service appears and a set of textual descriptors associated with the call or the reference identifying a use of the service.

15. The apparatus of claim 14, wherein, upon identifying a use associated with at least one service in the service-to-class mapping, the instructions further cause the processor to:

aggregate, by the Extensible Markup Language (XML)/JavaScript Object Notation (JSON) analyzer, the identified use into the use-to-service mapping.

16. The apparatus of claim 13, wherein the data structure is a structured data structure or a semi-structure data structure.

17. The apparatus of claim 13, wherein generating the identification of usage information of the data structure utilizes a join operation or a map reduction operation.

* * * * *